D. WARNER.
GATE.
APPLICATION FILED DEC. 2, 1907.
907,546.
Patented Dec. 22, 1908.
2 SHEETS—SHEET 2.
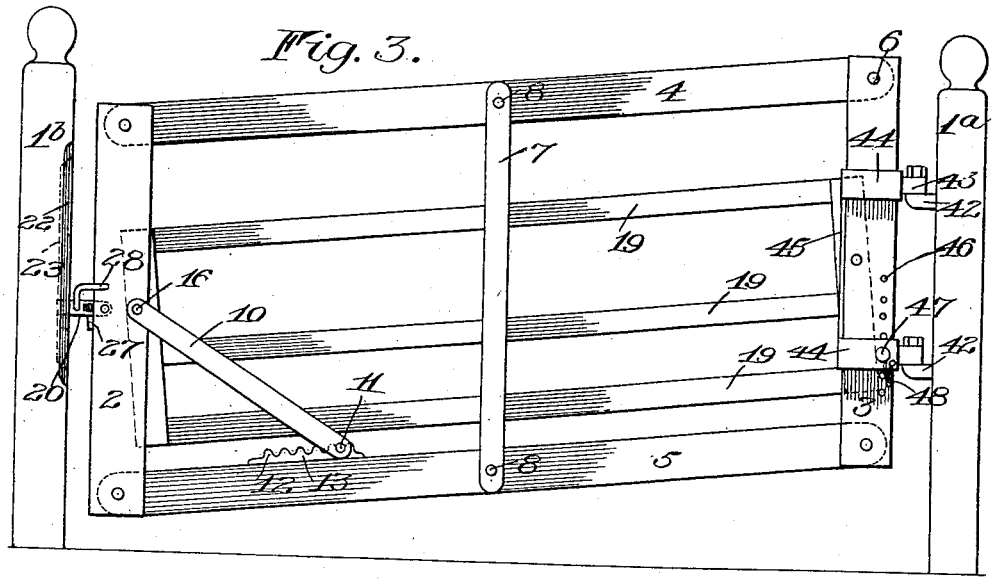
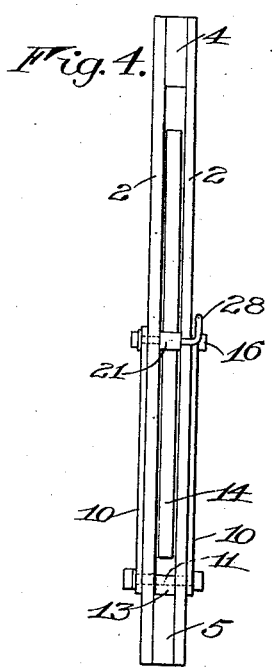
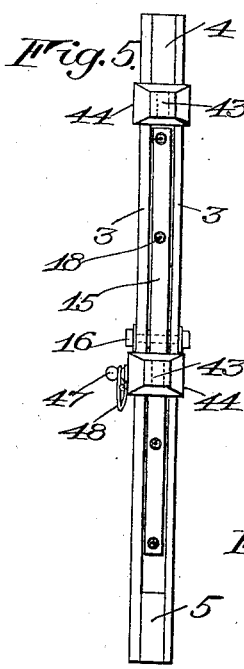
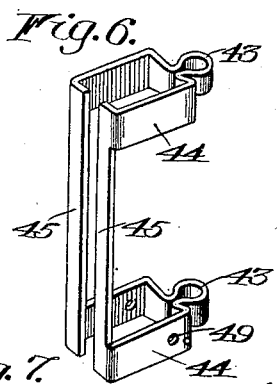
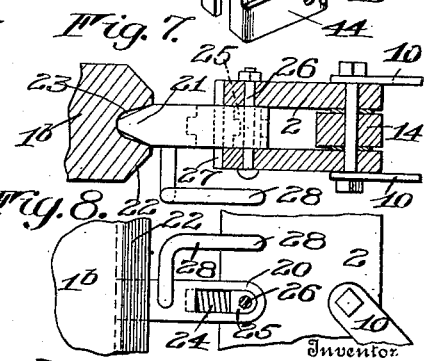
Witnesses
Walter B. Payne.
Inventor
Daniel Warner
By
his Attorneys

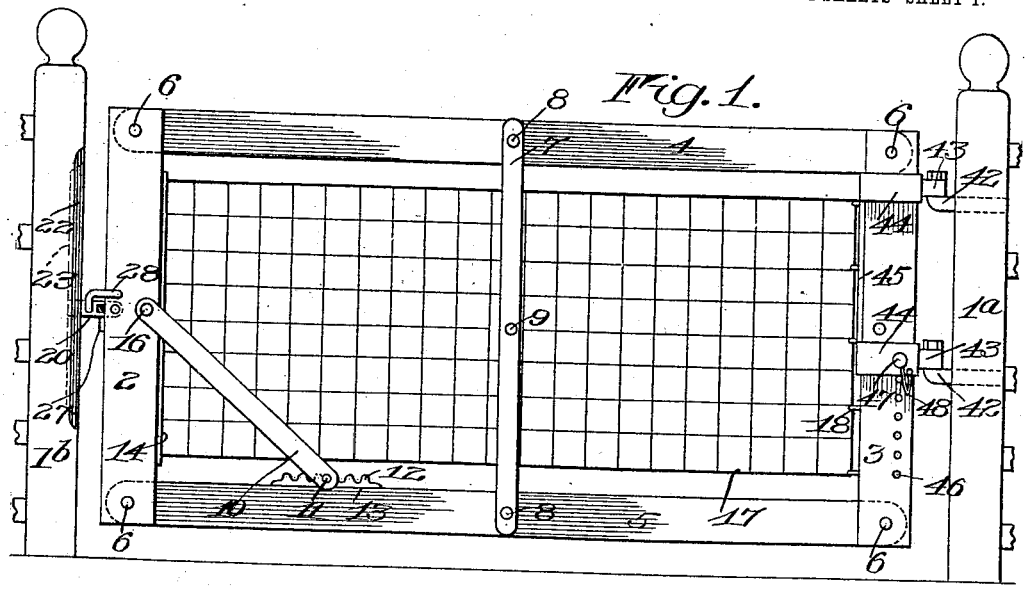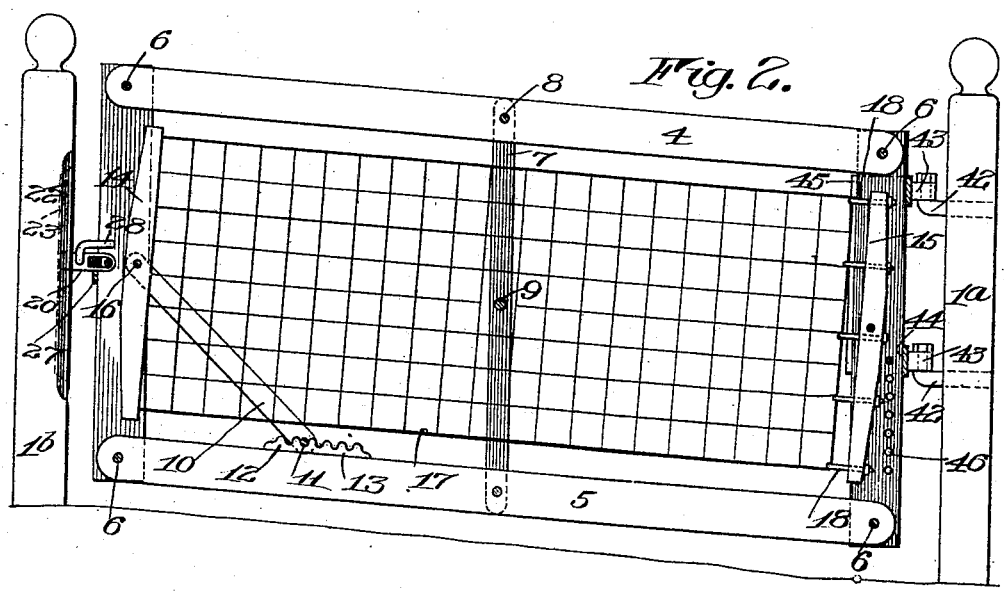

UNITED STATES PATENT OFFICE.

DANIEL WARNER, OF BRONSON, MICHIGAN.

GATE.

No. 907,546.        Specification of Letters Patent.        Patented Dec. 22, 1908.

Application filed December 2, 1907. Serial No. 404,684.

*To all whom it may concern:*

Be it known that I, DANIEL WARNER, of Bronson, Branch county, State of Michigan, have invented certain new and useful Improvements in Gates; and I do hereby declare the following to be a full, clear, and exact description of the same, reference being had to the accompanying drawings, forming a part of the specification, and to the reference-numerals marked thereon.

The present invention, which relates to gates for farms or stock yards, has for an object to provide a construction in which a gate frame having a supplemental frame composed of wire fabric, boards or other material may be adjusted to be used on an inclined surface.

A further object is to mount the gate frame in such a manner that it may be raised and lowered in order to permit it to be located above the ground and act as a stock sorter, the space between the ground and the lower edge of the gate permitting the passage of the smaller stock, but excluding the larger.

To these and other ends the invention consists in certain improvements and combinations of parts all as will be hereinafter more fully described, the novel features being pointed out in the claims at the end of the specification.

In the drawings: Figure 1 is a side view of a gate constructed in accordance with this invention; Fig. 2 is a vertical section of the same in another position. Fig. 3 represents a gate in which the supplemental frame is made of wood boards instead of wire fabric, as shown in Figs. 1 and 2, the constructions of the other parts of the gate being the same, but the gate frame being shown elevated on its hinges to permit the passage of small stock beneath its hinged end; Fig. 4 is a view of the front edge of the gate frame; Fig. 5 is a view of the rear edge with the hinge members secured thereon; Fig. 6 is a perspective view of the connected hinge members; and Figs. 7 and 8 are respectively a horizontal section and a side view of the gate latch or bolt.

Referring particularly to the drawing 1ᵃ and 1ᵇ indicate two posts, to one of which the gate frame is hinged and to the other of which it is fastened in a manner to be hereinafter described.

The gate frame in this instance comprises a latch carrying, a hinge carrying, and top and bottom members 2, 3, 4 and 5 respectively. The latch and the hinge carrying, or side members are preferably formed by two spaced pieces between which the upper and the bottom members are pivoted, as by bolts 6, a brace 7 being provided, if desired, to connect the top and the bottom member between the side members, and said brace being composed preferably of two pieces pivoted at 8 to opposite sides of the frame and connected between the top and the bottom member by a bolt 9. It will be noted that the top and the bottom member lie parallel, while the side members and the brace lie parallel and this arrangement owing to the provision of the pivots 6 and 8, permits the swinging end of the gate to be raised and lowered in order that the gate frame may be adjusted to agree with the inclination of the ground and thus prevent the exit of stock due to the formation of an opening. Of course, this arrangement can also be employed to adapt the gate to sort stock, the swinging end of the frame being elevated to permit the passage of some stock in single file and exclude the passage of other and larger stock, or when the rear side member of the gate is elevated as shown in Fig. 3, the swinging end can be lowered for the same purpose.

Between the bottom and the top members and between the side members is arranged a supplemental frame which in the form shown in Figs. 1 and 2 comprises two equalizing bars 14 and 15 centrally pivoted at 16 between the pieces forming the side pieces and connected by a wire fabric 17, suitable stretching devices, such as eye bolts 18 being employed to take up the slack in the fabric. The purpose of this supplemental frame is to permit the use of wire fabric which reduces the cost of manufacture of the gate; but, of course, where such a construction is desired, boards 19, as shown in Fig. 3, may be connected to the equalizing bars. In operation these bars permit the main frame to be adjusted without distorting the fabric, a condition which would take place if the fabric were secured directly to the side members.

A suitable means may be provided for sustaining the frame in its adjusted position, and this means may consist of an inclined brace 10 pivoted to the latch member on the bolt 16 and composed of two pieces, one arranged on each side of the latch member and connected at their lower ends by a bar 11 which is adapted to engage any one of a number of projections 12 arranged on a plate 13 secured to the bottom member 5.

The swinging of the gate is effected by a plurality of hinges, preferably two, one member 42 of each hinge (in this instance the pintle carrying member) being secured to the post and the other members 43 of the hinges (the eye carrying members) being connected together and adjustably secured to the gate frame. The vertical adjustment of the gate frame on its hinges may be permitted by providing each member 43 of the hinge with a loop 44, to fit the vertical side member 3, or other vertically arranged member at the rear end of the gate. Preferably both eye members of the loop are made from one piece of sheet metal which in its flattened state is of rectangular formation. Two opposite sides of the rectangle are bent midway to form the eyes of the two hinges, the loops being formed by the portions beyond the eyes. The other opposite sides 45 of the rectangle lie close together, as shown in Fig. 6, and form a connection between the two hinge members on which the gate frame is adjustable. The loops serve as clutches and will under normal conditions sustain the gate frame in any vertical position to which it may be adjusted, this being due to the weight of the gate which causes the side member 3 to bear with a great deal of pressure against that portion of the upper loop adjacent the connections 45 and against the opposite or rear portion of the lower loop. However, in order to prevent the gate slipping downward, due to sudden jars and other causes, I may provide the vertical member 3 with a vertically arranged series of openings 46 in any one of which may be fitted a pin 47 secured by a flexible connection 48 to the lower hinge member, the pin being also passed through horizontally alined perforations 49 in the lower loop.

Owing to the different elevations at which the front side member 2 may be positioned, it is necessary to provide a fastener which may secure the gate frame at any adjustment thereof. A fastener accomplishing this result is shown in Figs. 7 and 8 and comprises a combined latch and bolt 20 pivotally and slidably connected to the gate frame and having its free end beveled on opposite sides at 21 to coöperate with beveled faces 22 on opposite sides of post 1ᵇ so that the beveled ends can enter a vertical groove 23 in the post, a spring 24 serving to maintain the bolt normally projected. This spring is preferably in the form of a coil and is arranged within a slot in the bolt and seated at one end against the bolt and at its other end against an abutment 25 movable in the slot and journaled on a pivot pin 26 which permits the bolt to swing vertically, a stop 27 serving to limit its downward movement. The unlocking of the gate may be effected by an arm 28 extending from the latch and bolt.

A gate constructed in accordance with this invention permits the use of either wire fabric or boards while permitting its adjustment for an unlevel surface for the purpose of sorting stock. The gate frame when adjusted as shown in Fig. 3, permits stock to pass beneath it in single file, while when its front end is raised to a level with its rear end a greater number may pass beneath. This is very desirable, as in some instances, it is necessary to handle the stock one at a time, as when branding, and in other instances, perfect freedom of movement of the smaller stock is desirable.

The gate is sample in operation, inexpensive to manufacture and will stand very rough usage.

I claim as my invention:

1. In a gate, a gate frame comprising a main frame embodying side members and top and bottom members pivotally connected together, and a supplemental frame pivotally connected to the side pieces.

2. In a gate, a gate frame comprising a main frame embodying side members and top and bottom members, pivotally connected together, and a supplemental frame embodying equalizing bars pivoted to the side members, and connection between said bars.

3. In a gate, a gate frame comprising a main frame embodying side members and top and bottom members pivotally connected together, and a supplemental frame embodying equalizer bars pivoted to the side members, and a wire fabric connecting the equalizer bars.

4. In a gate, a gate frame comprising a main frame embodying side members and top and bottom members pivotally connected together, and a supplemental frame embodying equalizer bars pivoted to the side members, a wire fabric connecting the equalizer bars, and wire tighteners for the fabric.

5. In a gate, a gate frame comprising a main frame embodying top and bottom members and side members pivotally connected to the top and bottom members and formed by spaced pieces, of a supplemental frame embodying equalizing bars pivotally arranged in the spaced between pieces forming the side members, and connection between the equalizer bars.

DANIEL WARNER.

Witnesses:
A. LE ROY LOCKE,
FLORA I. DAVIS.